United States Patent [19]

Liem

[11] Patent Number: 4,772,952
[45] Date of Patent: Sep. 20, 1988

[54] FILM MAGAZINE

[75] Inventor: T. Khoen Liem, Geinhausen, Fed. Rep. of Germany

[73] Assignee: Honeywell Inc., Minneapolis, Minn.

[21] Appl. No.: 935,905

[22] Filed: Nov. 28, 1986

[30] Foreign Application Priority Data

Dec. 2, 1985 [EP] European Pat. Off. ........ 85 115286.8

[51] Int. Cl.⁴ .............................................. H04N 3/36
[52] U.S. Cl. ..................................... 358/214; 352/92; 342/179
[58] Field of Search ................ 358/214; 242/179, 180, 242/181; 354/303; 352/92

[56] References Cited

U.S. PATENT DOCUMENTS

| | | | |
|---|---|---|---|
| 3,223,008 | 12/1965 | Hunstiger | 242/180 |
| 3,769,457 | 10/1973 | Valenta, Jr. et al. | 358/214 |
| 4,038,493 | 7/1977 | Richards | 178/15 |
| 4,310,856 | 1/1982 | Poetsch | 358/214 |
| 4,319,280 | 3/1982 | Roos et al. | 358/214 |
| 4,452,523 | 6/1984 | Douglas | 354/303 |

Primary Examiner—Robert Lev
Attorney, Agent, or Firm—Mitchell J. Halista; Albin Medved

[57] ABSTRACT

For the evaluation of a film independent of its predetermined recording velocity, a film storage drum is provided on which a film take-up reel is mounted. The film storage drum and the film take-up reel are capable of rotating with respect to each other in both directions. The film is fed via the storage drum to the film take-up reel, whereat a film evaluating device is mounted on the storage drum with the film passing the evaluating device on its way from the storage drum to the film take-up reel.

9 Claims, 3 Drawing Sheets

FILM MAGAZINE

BACKGROUND OF THE INVENTION

1. Field of the Invention

The present invention relates to a film magazine.

2. Description of the Prior Art

A film magazine is usually used within a reconnassance airplane which files over a terrain and by means of a known infrared line scanning device takes a thermal image of the terrain flown over. Herewith the signals of infrared detectors feed laser diodes, the output signals of which are imaged in the film plane of the film magazine by means of a holographic disc scanning device. In the use of a special film, as for instance a dry silver film, the film may be developed aboard the airplane by heat treatment. The film recording velocity depends on the velocity "v" of the airplane and the height "h" of the airplane over the viewed terrain. With a constant relationship v/h a constant film recording velocity results. Basically the developed film may be analyzed aboard and, for instance, it would be possible to analyze the film by means of a TV camera and to display the resulting picture on the navigator's cathode-ray tube (CRT). However, the fixed film velocity prevents the observation of a still picture or the reverse motion of an already observed image cut-out.

SUMMARY OF THE INVENTION

It is an object of the present invention to provide an improved film magazine wherein an analyzation of the film is possible independent of the film recording velocity.

In accomplishing this and other objects, there has been provided, in accordance with the present invention a film magazine having a film supply reel, a film take-up reel, a film evaluation device located between the reels, and a film storage drum supporting the film take-up reel so that said film take-up reel and the film storage drum are rotatable with respect to each other and that the film evaluation device is stationarily mounted on the film storage drum.

BRIEF DESCRIPTION OF THE DRAWINGS

A better understanding of the present invention may be had when the following detailed description is read in connection with the accompanying drawings, in which.

DESCRIPTION OF THE PREFERRED EMBODIMENT

Figure 1:
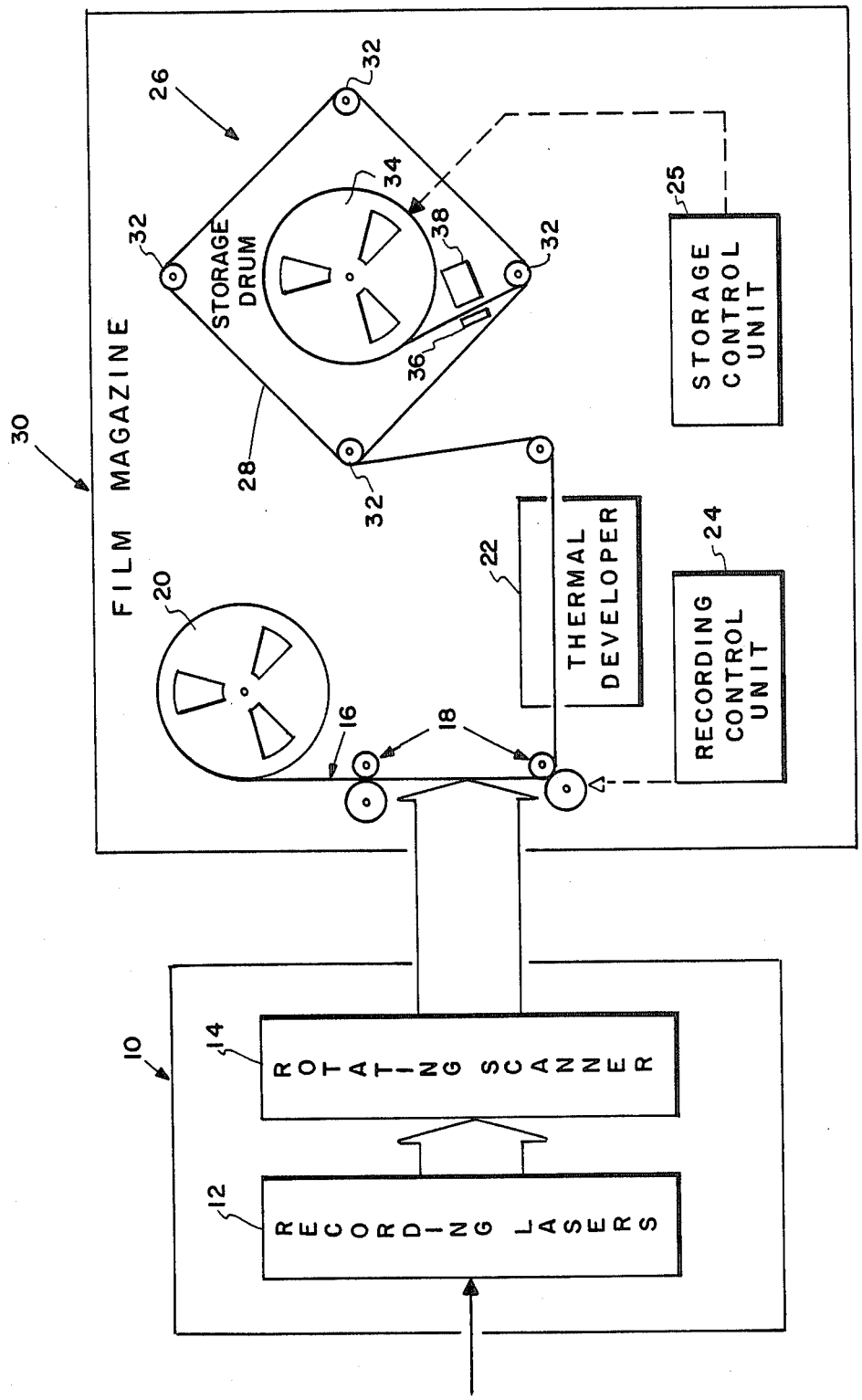
FIG. 1 is a block diagram illustration of a film magazine according to the present invention and a related recording unit shown.

Referring to FIG. 1, the image signals received by a plurality of infrared detectors (not shown) after an amplification and formating are fed to a recording unit 10, whereat the detector channels are connected to a device 12 consisting of a corresponding number of laser diodes, e.g., sixty four. The output signals of the laser diodes are projected by a rotating holographic disc scanning unit 14 into a plane of the film magazine 30 in which plane a film 16 is provided. The film is drawn off from a film supply reel 20 by means of appropriate film transportation equipment 18, and after its exposure is fed to a thermal developing station 22. The film may be a dry silver film on which the exposed picture can be fixed by heat treatment. The film recording velocity $v_1$ depends on v/h (v=velocity of the airplane; h=height over ground) and is controlled by means of a control unit 24. From the developing station 22 the film 16 is fed with the film recording velocity $v_1$ to a film handling device 26 which allows analyzation (viewing) of the film during the flight.

The film handling device 26 consists of a storage drum 28 on which rolls 32, 32', 32" and 32''' are rotatably mounted with the film being guided around said rolls. The rolls are arranged in a quadrangle with a film take-up reel 34 being mounted inside of the quadrangle. The storage drum 28 and the film take-up reel 34 are rotatable with respect to each other in both directions. From one roll 32''' the bottom layer of the film 16 is fed to the film take-up reel 34. Herewith the film 16 is passed between a light source 36 and a camera 38, e.g., vidicon, CCD, etc. The relative motion between the storage drum 28 and the film take-up reel 34 and therefor picture handling is for instance controlled by a plane navigator by a means, not shown, whereat a control unit 25 via appropriate driving means acts upon the storage drum 28 and film take-up reel 34. As may be seen, the selected picture for instance my be frozen in the event where the film take-up reel 34 is stopped and the storage drum 28 is quickly rotated so that the storage drum may wind up the film 16 coming from the developing station 22.

Figure 2:
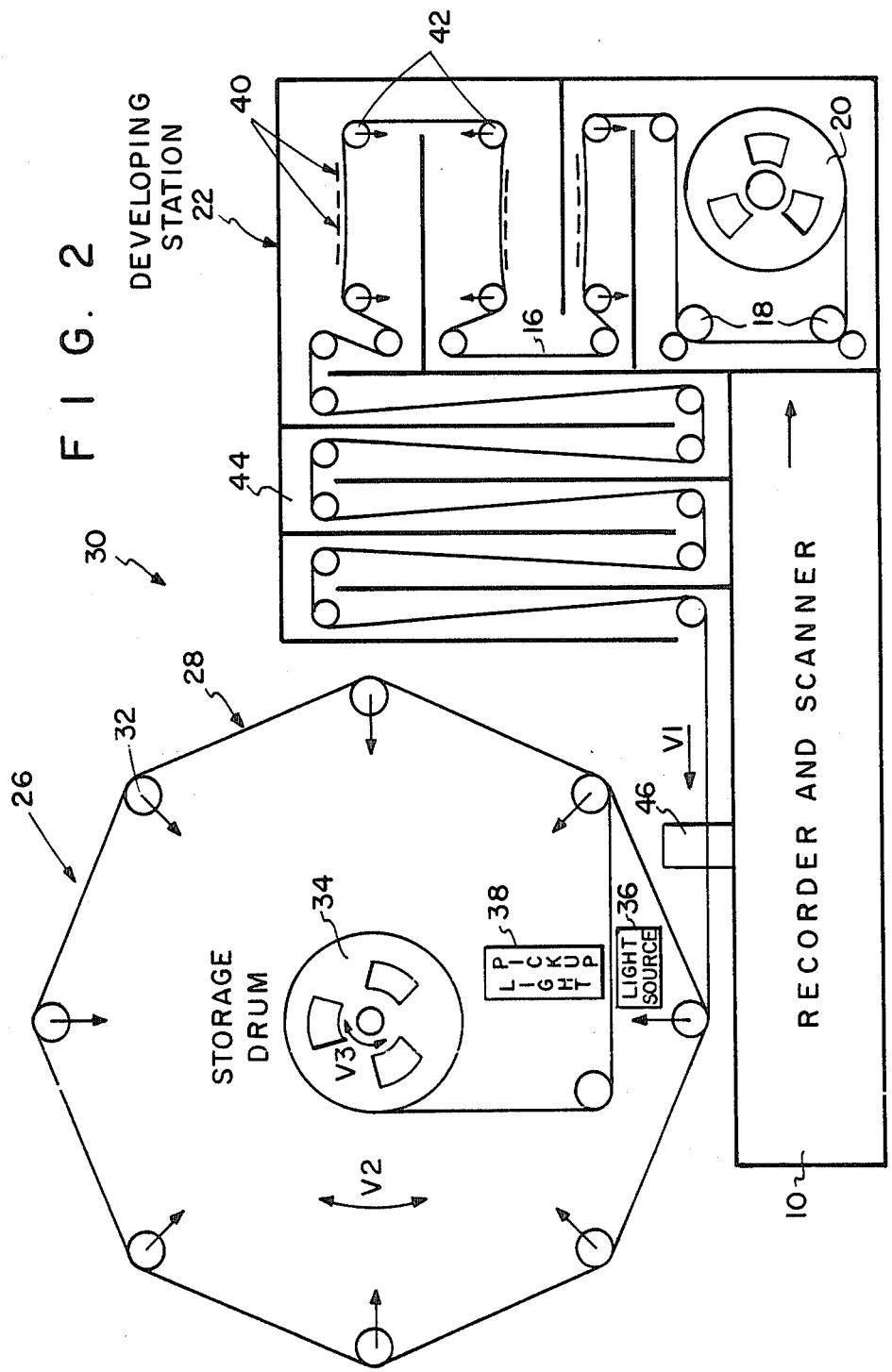
FIG. 2 is a pictorial illustration of a layout of equipment for implementing the magazine according to FIG. 1.

According to FIG. 2, a lay-out of equipment used in the block diagram according to FIG. 1 is shown. The recording unit 10 exposes the film 16 drawn off from the film supply reel 20 by means of the film transportation device 18, and the film 16 then is fed to segmented heating elements 40 within the developing station 22. The developing station 22 besides the segmented heating elements 40 includes rolls 42 within a thermal isolated chamber with the folls 42 being movable as indicated by arrows in order to bring the film into contact with a different number of segmented heating elements 40 as a function of the prevailing film recording velocity. From the developing station 22, the film 16 is fed to a cooling chamber 44 and afterwards is fed via a backstop 46 to the film handling device 30. This film handling device 30 is distinguished merely by the number of rolls 32 from the handling device shown in FIG. 1. Herewith the rolls 32 are arranged according to an octagon which approximates the storage drum 26 more to a circular shape.

Figure 3:
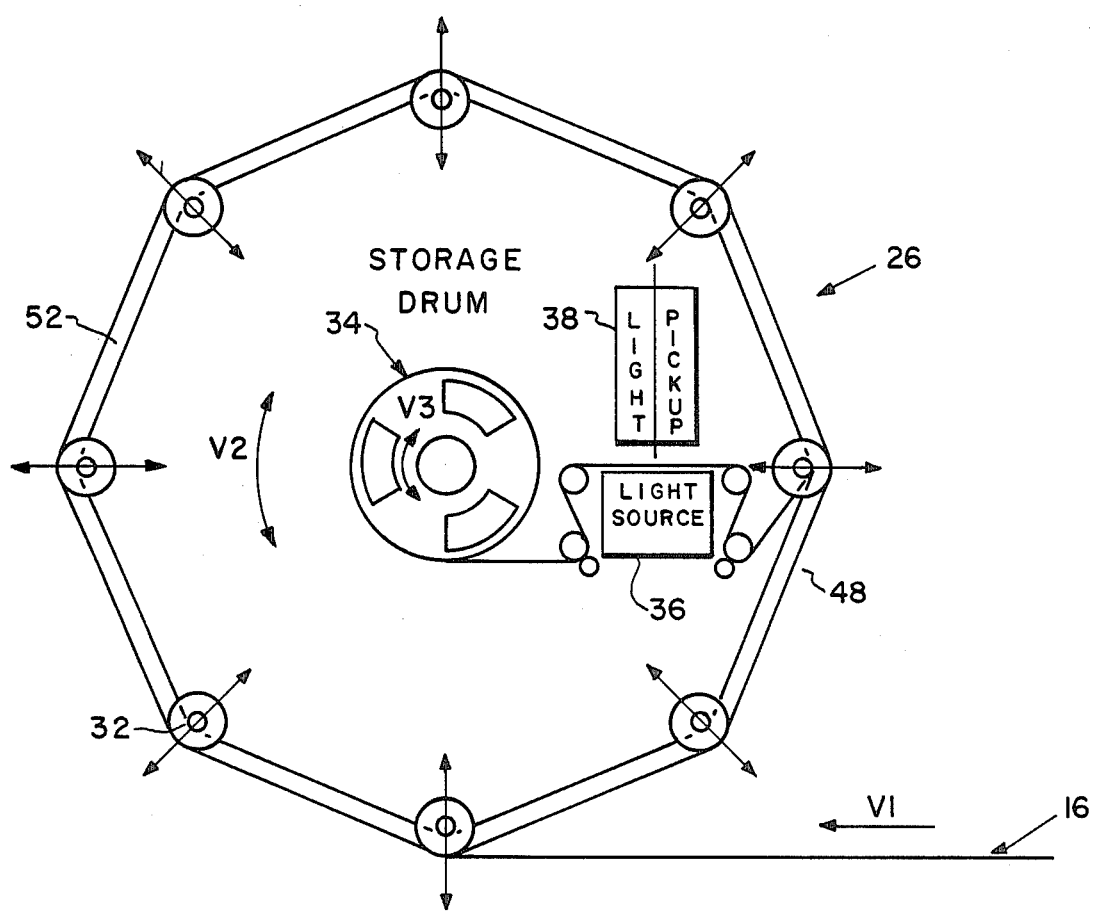
FIG. 3 is a pictorial illustration of a device for handling the viewing velocity of the film.

FIG. 3 shows the film handling device 26 in further detail. This device 26 includes a platform 48. On the platform 48, several rolls 32 are arranged in an octagon, whereat each roll 32 is able to rotate about its axis and is allowed to make a limited radial movement. On the platform 48, a light table 36 as a light source as well as a TV camera 38 with a zoom lense is arranged. Furthermore, the film take-up reel 34 is rotatably mounted on the platform 48. The film take-up reel 34 may rotate independently of the platform 48. The film 16 coming from the developing station is wrapped around the rolls 32, whereby a certain film storage 52 results and the film 16 then is fed from one roll to the film take-up reel 34 via the light table 36.

By an appropriate selection of the relative velocity between the film take-up reel and the storage drum, the following operational modes during analyzation and evaluation of the film are possible:

1. The viewing velocity corresponds to the film recording velocity—at this operational mode the clockwise rotational speed of the film take-up reel corresponds to the film velocity and the storage drum is not rotated ($v_2 = 0$).
2. Slow motion evaluation—herewith the clockwise rotational speed of the film take-up reel is reduced and the film take-up is compensated for by a clockwise rotational movement of the storage drum ($v_2 > 0$).
3. Picture freezing (still picture)—if a certain area of a taken picture shall be viewed in detail, no film is wound up on the film take-up reel and the storage drum rotates clockwise so that it can take-up the film fed from the developing station with retention of the film tension ($v_1 = v_2$).
4. Quick advance movement—if after a certain time period, the observer wants to analyze the just recorded film, the storage drum is rotated counterclockwise and the film take-up reel is rotated clockwise so that the film observing velocity is greater than the film recording velocity.
5. Reverse movement—if at a later point of time, the observer wants to analyze a certain area of the film just recorded before, then the clockwise rotational speed of the storage drum is increased and the film take-up reel is driven in counterclockwise direction.
6. Zoom—during picture freezing or slow motion evaluation, the observer may choose the film cutout and may release the camera zoom mechanism. Herewith advantage may be taken from the full resolution of the film.

During each of these operational modes, the film with the velocity $v_1$ can be wound-up by the film handling device 26.

Accordingly, it may be seen that there has been provided, in accordance with the present invention, an improved film magazine.

The embodiments of the present invention in which an exclusive property or privilege is claimed are defined as follows:

1. A film magazine comprising
   a film supply real,
   a film take-up reel,
   a film evaluation device located between said reels, and
   a film storage drum supporting said film take-up reel so that said film take-up reel and said film storage drum are rotatable with respect to each other and that said film evaluation device is stationarily mounted on said film storage drum.
2. A film magazine according to claim 1, wherein said film take-up reel is concentrically arranged with respect to said film storage drum.
3. A film magazine according to claim 2, wherein said film storage drum includes guide rolls mounted on a rotatable disc and defining a polygon with the film being wrapped around said guide rolls, whereat the inner film layer is guided from one of said guide rolls to said film take-up reel.
4. A film magazine according to claim 3, wherein said guide rolls are radially movable.
5. A film magazine according to claim 3, wherein said film evaluating device is mounted on said disc inside of the polygon.
6. A film magazine according to claim 5, wherein said film evaluating device includes a camera adjacent to a light source with the film being guided between the light source and the camera.
7. A film magazine according to claim 6, wherein said camera is a Vidicon camera.
8. A film magazine according to claim 6, wherein said camera is a CCD camera.
9. A film magazine according to claim 1 wherein between said film supply reel and said film storage drum a film recording device and a film processing device are provided.

* * * * *